G. H. CHINNOCK.
Steam Cooking Apparatus.
No. 157,374. Patented Dec. 1, 1874.
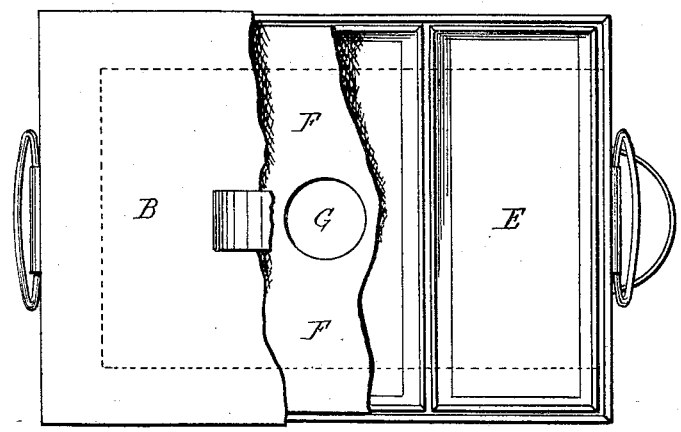
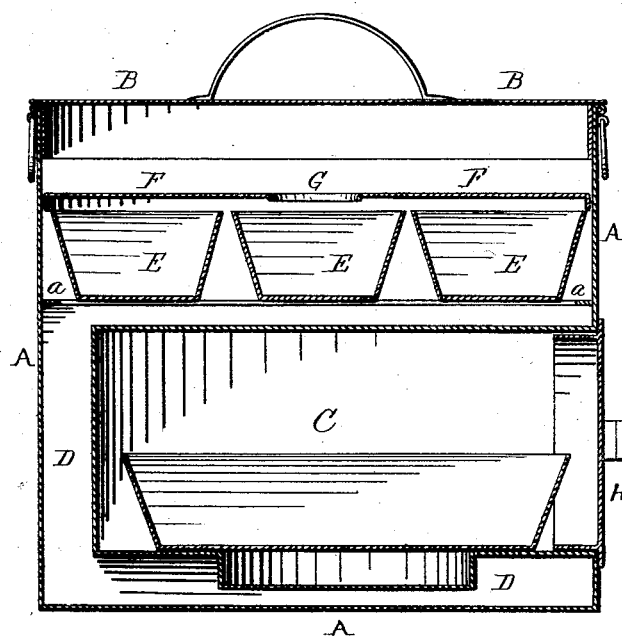
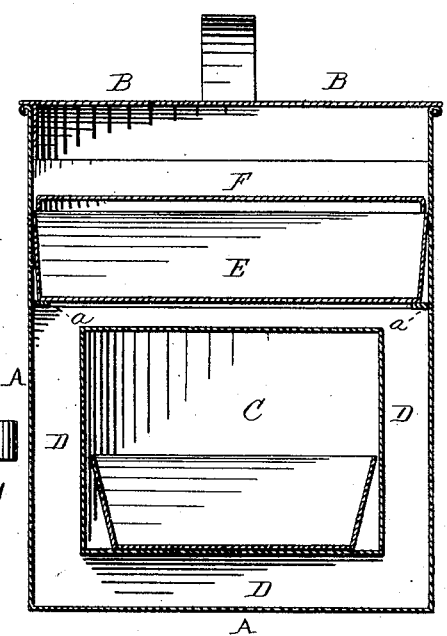
Witnesses.
Inventor.
Geo. H. Chinnock.
By James L. Norris
Atty.

UNITED STATES PATENT OFFICE.

GEORGE H. CHINNOCK, OF BROOKLYN, NEW YORK.

IMPROVEMENT IN STEAM COOKING APPARATUS.

Specification forming part of Letters Patent No. 157,374, dated December 1, 1874; application filed October 2, 1874.

*To all whom it may concern:*

Be it known that I, GEORGE H. CHINNOCK, of Brooklyn, in the county of Kings and State of New York, have invented certain new and useful Improvements in Hot-Air and Steam Apparatus for Cooking, of which the following is a specification:

This invention has for its object to furnish a combined oven and steam cooking apparatus, whereby meats, vegetables, and edibles in general may be baked, cooked, or boiled in a simple and convenient manner by the heat of a common cooking-stove.

The invention consists in placing directly over the pans a supplementary cover or plate, which is provided with a large central opening with flanged edges and with cut-away corners, so as to permit the upward passage of any excess of steam and the return of the water of condensation to the water-space.

In the accompanying drawings, Figure 1 is a top view of my invention, showing the main and supplementary covers broken away to represent the pans below. Fig. 2 is a central longitudinal section, and Fig. 3 is a transverse section, of the same.

The box or chest A, constituting the outer casing of my portable oven and steamer, is generally made of a rectangular form, and is surrounded with an open top closed by means of a detachable cover, B. An oven-chamber, C, is formed within the casing A by the relative arrangement of two side plates and one rear and one bottom plate, which form closed walls to cause the oven to be in no communication whatever with the surrounding steam-generating chamber or space. The walls of the oven are located at a suitable distance from the outer casing to leave a space, D, below, at both sides, and at the rear end of the oven, said space being designed for holding the water which is required for generating the steam used for cooking the articles placed in the upper chamber of the apparatus. Above the top of the oven there are arranged ledges or shoulders *a* for supporting the pans or receptacles E containing the edibles to be cooked. Said pans are placed at a suitable distance from each other, to leave spaces between the same, and, being also elevated above the top of the oven by the ledges on the sides of the casing, the steam which ascends from the generating-chamber below can circulate under, between, and over the pans, so as to expose the edibles contained therein to the greatest possible degree of steam heat, which insures a perfect and expeditious cooking of the contents of the pans. A supplementary cover or plate, F, is located above the pans, the object of which is to confine the steam below the same and yet permit the upward passage of an excessive quantity of steam through a large opening, G, formed in the center of said supplementary cover. The sides of the latter are turned up or flanged, as shown at *b*, and provided with cut-away corners or openings *c* at the latter points. The steam which passes through the opening in the supplementary cover is condensed, and the water thus produced flows over the cover to the corners thereof, whence it passes downward between the pans to the water-space to be again converted into steam. The oven is admirably adapted for baking or roasting purposes, as it is sufficiently large to receive pans or dishes of various sizes, and it can also be used for keeping articles of food warm. The center of the oven-bottom is provided with a depression, G, for the reception of a dish corresponding in shape thereto. Several dishes can thus be placed above each other. The open front of the oven is closed by means of a detachable door, H, which is properly fitted so as to be perfectly tight.

The combined cooker and oven constructed as above described can be set on an ordinary cooking-stove, and is capable of being used for the various purposes set forth. It is always ready for operation, and requires little or no attention, and it thus commends itself to all.

What I claim is—

The casing A, having the central oven-chamber C, surrounding water-space, and the flange or shoulder *a* above the oven for supporting the pans or receptacles containing the edibles to be steamed, in combination with the removable cover B for closing the top of the casing, and the removable cover H for closing the open front of the oven-chamber.

In testimony that I claim the foregoing I have hereunto set my hand.

GEO. H. CHINNOCK.

Witnesses:
JAMES L. NORRIS,
ALBERT H. NORRIS.